Figure 1:
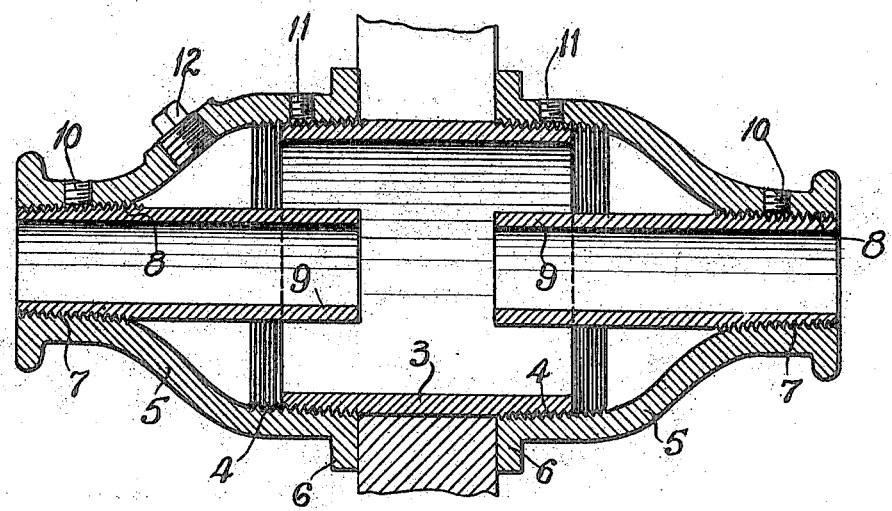

Oct. 14, 1924.  
G. T. WRIGHT  
BEARING  
Filed Feb. 23, 1923  
1,511,861

Inventor:  
George T Wright  
By Edward E Longan  
Attorney

Patented Oct. 14, 1924.

1,511,861

UNITED STATES PATENT OFFICE.

GEORGE T. WRIGHT, OF ST. LOUIS, MISSOURI, ASSIGNOR OF ONE-HALF TO LOUIS P. REISS, OF MATTOON, ILLINOIS.

BEARING.

Application filed February 23, 1923. Serial No. 620,646.

*To all whom it may concern:*

Be it known that I, GEORGE T. WRIGHT, a citizen of the United States, and resident of the city of St. Louis and State of Missouri, have invented certain new and useful Improvements in Bearings, of which the following is a specification containing a full, clear, and exact description, reference being had to the accompanying drawings, forming a part thereof.

My invention relates to improvements in bearings and has for its object, a bearing which can be cheaply constructed and which can be readily secured to a support or frame without the necessity of employing bolts or lag screws.

A further object is to construct a bearing which is not only cheap to manufacture but at the same time provides a long bearing surface, and also an oil or grease reservoir of considerable size so that the oiling of the bearing is only necessary at long intervals.

Figure 2:
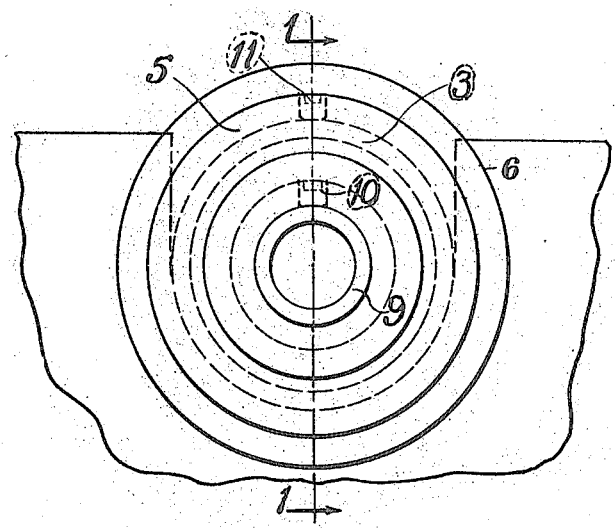

In the drawings:

Fig. 1 is a longitudinal vertical section of my device taken on the line 1—1 of Fig. 2 and Fig. 2 is an end view of the same.

In the construction of my device I employ a sleeve 3 which is provided with threads 4 on each end, secured over the threads 4 is a reducer 5 which has formed integral with its large end a flange 6, its small end is provided with screw threads 7 into which the screw threaded end 8 of a sleeve 9 is secured. In order to prevent the sleeve 9 from becoming loosened due to the rotation of the shaft, I employ fastening means 10, this fastening means is preferably a set screw, although if desired, I may flare the end 8, similar to the manner of rolling in a boiler flue, to secure the sleeve in the reducer. This also will prevent the sleeve from becoming accidentally loosened.

In order to secure my bearing either in a machine frame or to a post or other suitable support, the reducers 5 are moved apart so that the space between the flanges 6 will be slightly greater than the part to which the bearing is to be secured, the sleeve 3 is then placed in position in a recess as illustrated in Fig. 2, which has been previously cut in the support and the reducers screwed up on the sleeve, after the reducers have been drawn up tight enough on the support to hold the bearing firmly, securing means 11 are employed to prevent the reducers from loosening on the sleeve.

I may also if desired, enlarge the flanges 6 so that it will not be necessary to cut a recess in the support; with the enlarged flanges the sleeve 3 is merely brought in contact with the support and the reducers screwed up sufficient to cause the flanges to grip the support and hold the bearing in place.

By my construction a bearing of any length can be readily made as it is only necessary to increase the length of the sleeve 3. I also form an oil opening 12 in one of the reducers for the introduction of a lubricant either oil or grease, or I may eliminate the opening 12 and pack the inside of the bearing with grease before assembling the parts. The sleeves 9 are preferably made of brass, although other matrials may be used.

The bearing of my construction eliminates the use of expensive patterns and also the necessity of babbitting the bearing.

I may also, if desired or found necessary, utilize other means than the flanges on the reducers for securing the bearing to a support, this means may be either straps, U bolts or similar fastening means.

This device can also be used on loose pulleys, the tapering of the reducers tending to feed the oil back to the shaft thereby overcoming to a great degree the clinging of the lubricant to the sleeve 3 due to the force of gravity; in fact the reducers will feed the oil away from the sleeve and cause it to contact with the bearing sleeves 9.

Having fully described my invention, what I claim is:—

1. A bearing comprising a sleeve, a reducer located on each end of said sleeve, means for securing said reducers to the sleeve, and a sleeve located in the small end of each reducer, said sleeves extending toward each other and located within and spaced apart from the first mentioned sleeve.

2. A bearing comprising a sleeve having threads on each end, a reducer located on each end of said sleeve, and a second sleeve secured in the small end of each of said reducers, said sleeves extending toward each other, said sleeves being spaced apart from each other and from the first mentioned sleeve, and means for securing said sleeves in said reducers.

3. A bearing comprising a sleeve, a flanged reducer located on each end of said sleeve, means for securing said reducers to said sleeve, a sleeve located in the small end of each reducer, said sleeves extending toward each other and within the first mentioned sleeve and spaced apart therefrom and from each other, and means for securing the second mentioned sleeves in the reducers.

4. A bearing comprising a sleeve having threads on each end, a flanged reducer located on each end of said sleeve and adapted to be screwed thereover, means carried by the reducer for preventing rotation on the sleeve, a second sleeve carried by each reducer and extending within the first mentioned sleeve, said second mentioned sleeve being spaced apart from the first mentioned sleeve so as to provide an oil reservoir, and means for preventing the second mentioned sleeve from becoming loosened in the reducer.

In testimony whereof, I have signed my name to this specification.

GEORGE T. WRIGHT.